F. SAILE.
LAWN TRIMMER.
APPLICATION FILED MAR. 4, 1915.

1,275,307.

Patented Aug. 13, 1918.

WITNESSES:
Chas H Young
Jane Glazier

INVENTOR
Frederick Saile
BY
Parsons Bodell
ATTORNEYS

UNITED STATES PATENT OFFICE.

FREDERICK SAILE, OF SYRACUSE, NEW YORK.

LAWN-TRIMMER.

1,275,307.

Specification of Letters Patent.

Patented Aug. 13, 1918.

Application filed March 4, 1915. Serial No. 12,055.

*To all whom it may concern:*

Be it known that I, FREDERICK SAILE, a citizen of the United States, and a resident of Syracuse, in the county of Onondaga and State of New York, have invented a certain new and useful Lawn-Trimmer, of which the following is a specification.

This invention has for its object a lawn trimmer in which the various sizes of grass shears can be inserted and operated, and it consists in the features of construction hereinafter set forth and claimed.

In describing this invention, reference is had to the accompanying drawings, in which like characters designate corresponding parts in all the views.

Fig. 2 is an elevation, partly in section, looking to the left in Fig. 1, the shears being omitted.

Figure 1:
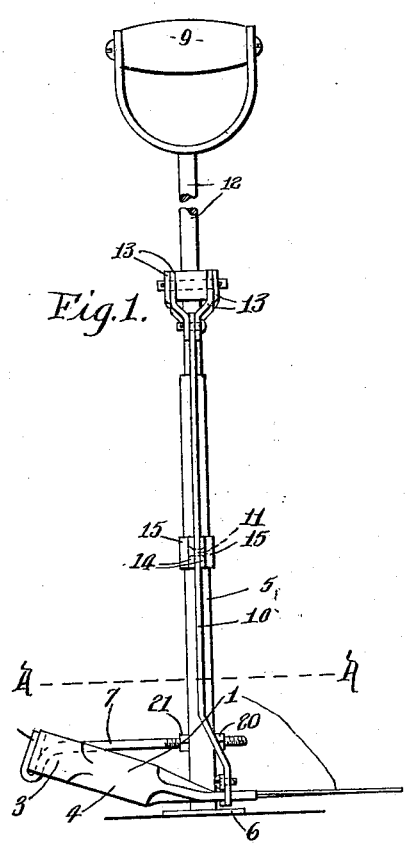
Figure 1 is a side elevation of this lawn trimmer.
Figure 3:
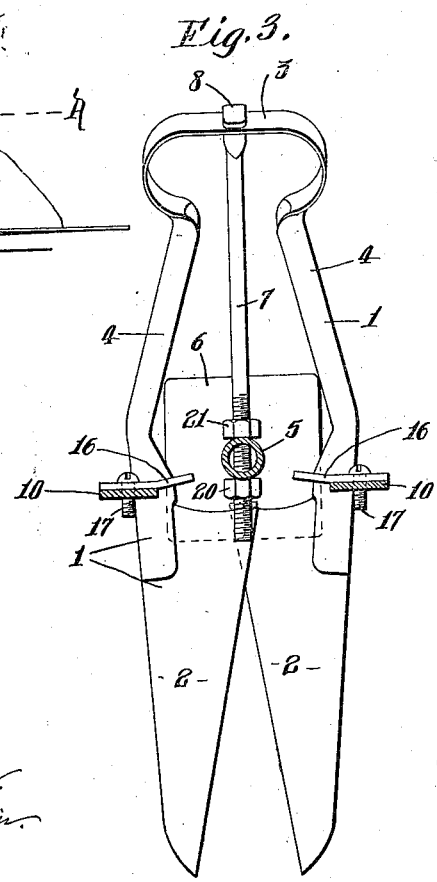
Fig. 3 is an enlarged cross-sectional view on line A—A, Fig. 1.
Figure 6:
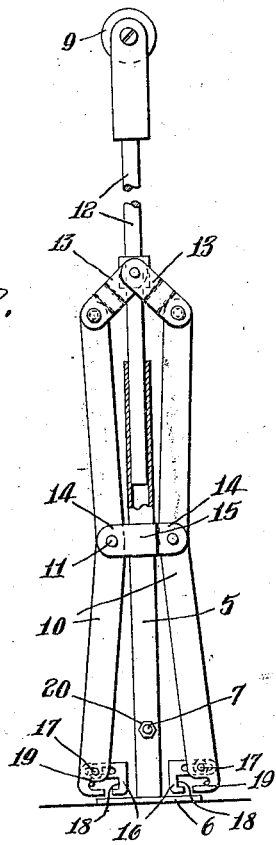

This lawn trimmer comprises, generally, shears, a holder for the shears including movable members connected to the sides or blades of the shears, and a handle connected to said movable members.

1 designates the shears which may be of any desirable form, size and construction, the shears being here shown as of the usual type and having opposite sides including blades 2, and shanks 3, and an intermediate spring bow 4, connecting the shanks.

The holder for the shears includes means for detachably engaging the intermediate part or bow 4, and said movable members which form part of the holder are also detachably engaged with the sides of the shears either with the shanks 3 or the blades 2 so that the shears can be readily detached and other shears inserted. In order that the holder may be adapted for different sizes of grass shears, the means supporting the intermediate part or bow 4 of the shears is adjustable forwardly and rearwardly.

In this embodiment of my invention, the holding means includes an upright tubular base 5 having a foot 6 at its lower end below the shears, a rearwardly extending arm or rod 7 having a hook 8 at its rear end for engaging the bow 4, the hook being shaped to form an open-ended slot which is open at its upper end, a handle 9 connected to the base 5 and movable toward and from the foot 6, and power transmitting members between the handle and the sides of the shears. These members are here shown as levers 10 pivotally connected at 11 between their ends to the base 5 and having clamping means at their lower ends for embracing the sides of the shears, and being connected at their upper ends to the handle 9.

The handle as here shown consists of a rod 12 movable vertically and telescoping in the base 5, the rod 12 being connected to the upper ends of the levers 10 by means of toggle links 13. The levers are not pivoted directly to the base 5, but to ears 14 at the opposite ends of plates 15 suitably secured or clamped to the base 5.

The clamping means at the lower ends of the levers 10 comprises jaws 16 movable horizontally toward and from the lower ends of the levers 10 and connected thereto by pin-and-slot connections, the pins 17 of which are screws extending through slots in the jaws 16 and threading into holes in the levers 10. These clamping members 16 are formed with open-ended slots 18 which are alined with open-ended slots 19 formed in the lower ends of the levers 10, the slots 18, 19 being shaped to engage the shanks 3 of the shears.

The arm 7 is adjustable forwardly and rearwardly relatively to the base 5, and is here shown as threaded at its forward end and extending through openings in the base and having nuts 20, 21 thereon which turn against front and rear faces of the base.

In operation, the intermediate part or bow 4 of the shears is inserted in the hook 8, the sides or shanks of the shears placed in the slots 18 and 19 and the jaws 16 secured in position by means of the screws 17. The device is then operated by placing the foot 6 on the ground and moving the handle vertically and downwardly, thus moving the blades of the shears toward each other to cut the grass. When the downward pressure on the handle is discontinued either the spring in the bow 4 will open the shears and return the handle upwardly, or the pull on the handle against the downward pull due to the weight of the device will open the shears.

This device is particularly advantageous in that ordinary grass shears can be held therein and can be easily removed and replaced, and further in that it is convenient to operate.

What I claim is:

1. A lawn trimmer including a base including a foot and an upwardly extending part, a vertically movable handle, shears supported by the base and having the side portions thereof extending on opposite sides of the upwardly extending part of the base, levers pivoted to the upwardly extending part of the base on opposite sides thereof and having means at their lower ends for securement to the shears, and connections between the upper arms of the levers and the handle whereby upon compression of the handle toward the base the upper ends of the levers are moved outwardly and their lower ends inwardly to close the shears, substantially as and for the purpose described.

2. A lawn trimmer comprising shears, a holder for the shears including a base having a foot located below the shears, upwardly extending levers pivoted between their ends to the base above the foot and having the lower arms thereof connected to the opposite portions of the shears, a downwardly movable handle, and connections between the handle and the upper arms of said levers to move the same outwardly upon downward movement of the handle, substantially as and for the purpose specified.

3. A lawn trimmer comprising shears, a base comprising a foot located below the shears and an upright tubular portion located between opposite portions of the shears, a handle having a stem slidable in the upright portion of the base, levers pivotally connected between their ends to the said tubular portion on opposite sides thereof, means connecting the lower arms of the levers and opposite portions of the shears, and means connecting the handle and the upper arms of the levers to actuate the levers upon downward movement to the handle relatively to the foot, substantially as and for the purpose set forth.

4. A lawn trimmer comprising shears including opposing blades, and a bow spring connecting the blades, a base including a foot having an upright portion extending between the blades and a rearwardly extending arm having a socket in which the intermediate part of the bow spring of the shears is seated, a vertically movable handle, power transmitting members supported by the upright portion of the base on opposite sides thereof, clamping means for detachably connecting the lower ends of said power transmitting members to the blades, and means for transmitting the motion of the handle to the upper ends of the power transmitting members, substantially as and for the purpose described.

5. A lawn trimmer comprising shears, a holder for the shears including an upright base extending between sides of the shears in the rear of the blades, the base having a foot at its lower end, an arm projecting rearwardly from the base, and formed with a means for detachably engaging and supporting the intermediate part of the shears, said arm being adjustable forwardly and rearwardly, levers pivotally connected between their ends on the base on the opposite sides thereof and having clamping means at their lower ends for detachably engaging the sides of the shears on opposite sides of the base, a handle telescoping with the base and being movable vertically, and toggle links connecting the handle and the upper ends of the levers, substantially as and for the purpose set forth.

In testimony whereof I have hereunto signed my name, in the presence of two attesting witnesses, at Syracuse, in the county of Onondaga, and in the State of New York, this 21st day of January, 1915.

FREDERICK SAILE.

Witnesses:
S. DAVIS,
J. GLAZIER.

Copies of this patent may be obtained for five cents each, by addressing the "Commissioner of Patents, Washington, D. C."